Nov. 11, 1947.  R. A. JOHNSTONE  2,430,513
WORK CENTERING TOOL
Filed Oct. 29, 1945  2 Sheets-Sheet 1

INVENTOR.
Robert A. Johnstone
BY
Oliver B. Kaiser
atty.

Nov. 11, 1947.  R. A. JOHNSTONE  2,430,513
WORK CENTERING TOOL
Filed Oct. 29, 1945  2 Sheets-Sheet 2

INVENTOR.
Robert A. Johnstone
BY
Oliver B. Kaiser
Atty.

Patented Nov. 11, 1947

2,430,513

UNITED STATES PATENT OFFICE 2,430,513

WORK CENTERING TOOL

Robert A. Johnstone, Aurora, Ind.

Application October 29, 1945, Serial No. 625,278

2 Claims. (Cl. 77—18)

This invention relates to a combined work centering tool and steady rest for center drilling into the end of a shaft or cylindrical piece of work at the exact center, so that the work can be appropriately mounted and positioned within a machine tool, as an engine lathe for turning and or machining.

The tool is particularly adapted to be socketed into a machine tool spindle as for example, either the dead or live spindles of an engine lathe or centering machine and carries a center cutting drill which is advanced into the work as by the feeding screw action of a tail stock spindle. The tool centers and rests the work for the drilling operation while the work is rotated by the work holding and rotating spindle of the head stock of a lathe, to or within which the work is chucked or clamped. The tool can also be socketed into a live or rotating screw feeding spindle of a centering machine wherein the work is held stationary and the tool revolves. The tool is applicable for use within various types of machines, so that the style or class of machine in which it may be installed is optional and may depend upon the volume or character of work to be centered, recognized that either the tool or the work may be revolved or rotated and relatively advanced for obtaining and governing the depth of center drilling.

An object of the invention is to provide a work and center drilling tool of simple, efficient and durable construction for quickly and accurately center drilling into an end of a shaft or cylindrical piece of work by engagement into the tool and the tool having a tapering shank for readily fixedly socketing the same into a rotatable or non-rotatable spindle and the drilling performed by either tool or work rotation and relative feeding advancement.

Various other features and advantages of the invention will be more fully set forth in the following description of the accompanying drawings, forming a part hereof and depicting a preferred embodiment, in which.

Figure 1:
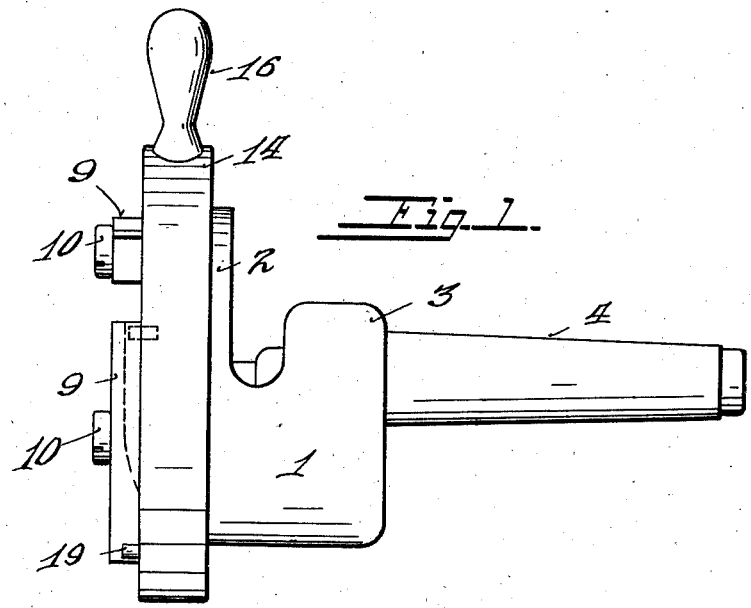
Figure 1 is a side elevation of the improved tool.
Figure 2:
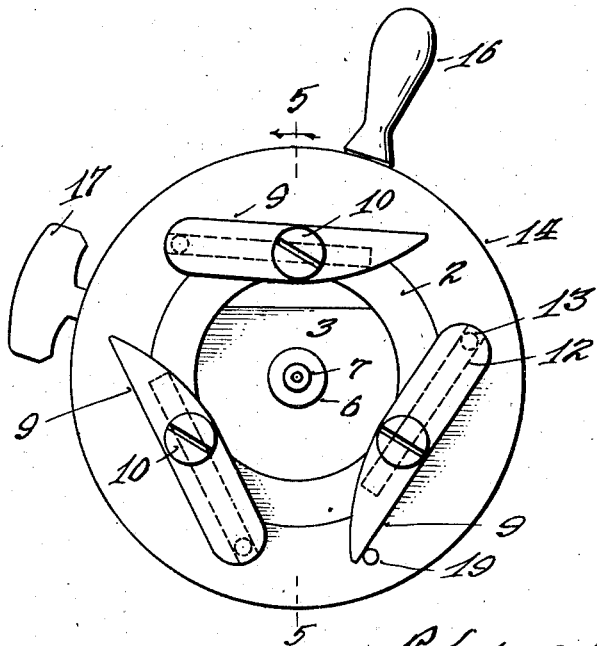
Figure 2 is an elevation of the work receiving and centering end or face side of the tool, with the work centering fingers adjusted and set to an outward or inactive position.
Figure 3:
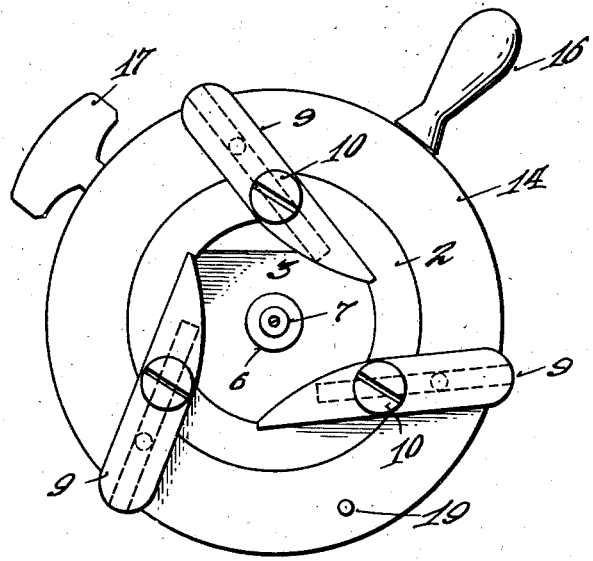
Figure 3 is a view similar to Figure 2, with the fingers adjusted and set to an active or work engaging and centering position.
Figure 4:
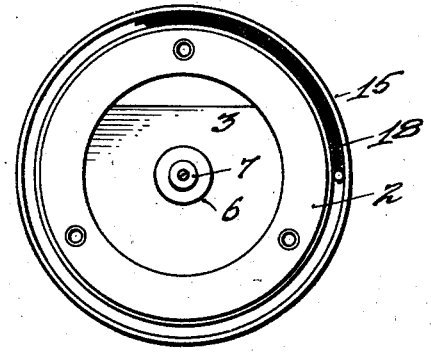
Figure 4 is an end view of the stock or body of the tool, with the fingers and finger controlling collar or ring rotatable upon the stock removed.
Figure 5:
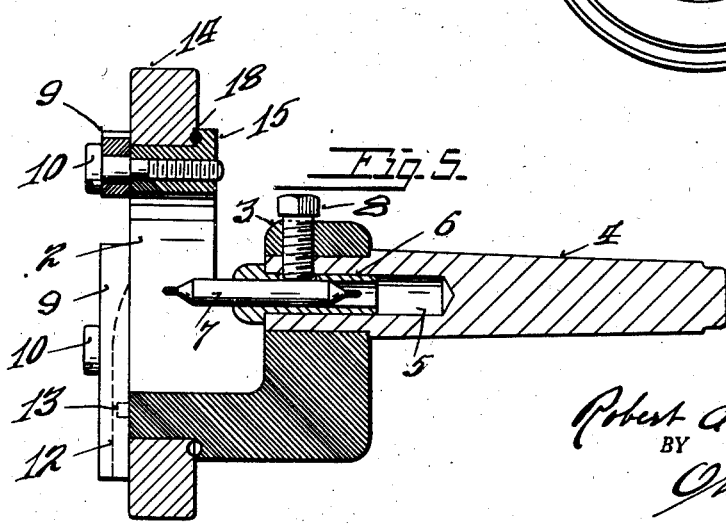
Figure 5 is a section on line 5—5, Figure 2.

Referring to the drawings, 1 indicates the stock of the tool of off-set form, providing a cylindrical body 2, having a relatively rearwardly spaced hub 3, connected therewith. The hub 3, has a bore therethrough coaxially with the cylindrical body 2, for receiving and mounting the counterturned end of a tapering shank 4, extending axially from the rear side of the hub. The counterturned end of the shank is compressively fixed into the bore of the hub.

The forward end of the shank has a central bore 5, longitudinally therein for the reception of a headed bushing 6, into which a center boring or drilling bit 7, is socketed and fixed by a set screw 8, screw threaded into the hub of the stock and traverses an aperture in the counterturned portion or head end of the shank 4, and a registering aperture in the bushing 6, to bring its end into bearing or clamping contact with the boring bit 7, which is shown as of double drill end form.

The face side or end of the cylindrical body 2, of the stock is provided with a plurality of fingers 9, preferably three in number, each characteristic of a lever and of exact dimension and duplicate form, pivotally mounted thereon respectively by a screw 10, engaged and threaded into the cylindrical body.

The pivotal axes of the fingers are uniformly spaced apart and at a corresponding distance diametric from the axis of the tool, adapting the work centering ends of the fingers to coordinately swing inwardly toward the stock axis to bring their work engaging edges impressively upon the circumference of the work traversing therebetween. The fingers each have a curved side or edge 11, for contacting with the work, the curve having a radius which would not function as a cam or eccentric to effect an increasing holding pressure upon the work under frictional engagement thereof in the relative rotation of either the work or the tool when center drilling. The edge surface may be inclined to extending tangentially of the circumference of the work, interposed between the fingers and the shaping of the forward end of the fingers provides each of pointed form to permit the same to be brought inward in an active work centering position to almost the axis of the tool to center gauge the cutting point of the bit to determine whether it is in center.

The underside of each finger has a slot 12, longitudinally therein and radially of the axis of the pivot of the finger, for the reception of a pin or stud 13, fixed to and extruding from the face side of a finger control collar 14, concentrically journaled and mounted upon the cylindrical body 2, of the stock. The rear side of the finger control collar 14, bears against an annular shoulder or flange 15, of the stock. The collar 14, is confined upon the cylindrical body of the stock by the rear ends of the fingers which overlap the face side thereof.

Upon rotation of the finger control collar 14, in either of alternate directions the work gauging or centering ends of the fingers are simultaneously moved either inward toward the axis of the stock or outward therefrom, depending upon the direction of collar rotation.

The control collar 14, has a handle 16, extending radially from its periphery for manually oscillating the collar, and a thumb screw 17, for locking the collar to the stock in any adjusted or finger setting position.

The shoulder 15, of the stock and the adjoining face side of the collar are opposingly grooved to provide an annular channel in each and relative in registry for receiving and housing a spring 18, one end of which is fixed to the stock and the opposite end to the collar 14, to automatically rotate the collar in a direction to swing the gauging ends of the fingers outwardly to a maximum degree, when the collar is released from a finger setting position, the normalizing action being limited by a pin 19, projection from the face side of the collar in the path of swing of the outer end of one of the fingers.

In the operation of the tool, after it has been installed by means of its tapering shank within the spindle of a machine tool, as of a lathe tail stock, the fingers are normally in their open position, that is away from the axis or center of the tool, to receive a piece of work or bar to be end center drilled which is inserted into the tool, approximately to a depth to have its end contact with the cutting end of the drill bit. The finger controlling collar 14, is then rotated in an appropriate direction, to swing the fingers inward, moving in unison, until they are brought into bearing contact with the circumference of the work, which will centralize the axis of the work with the drill bit, whereupon the collar is locked to its finger setting position.

The work is thus centered and sustained for an end center drilling operation, and depending upon the class of machine or apparatus within which the center drilling tool has been installed, either the work of the tool is revolved and relatively advanced or fed for moving the center drilling bit into the end of the work, during which period the fingers serve as a steady rest for the work, sustaining the same in its centered position.

When several pieces of work of the same diameter are to be successively center drilled, there generally is no need to disturb the setting of the fingers, as the work can readily be slipped out of the tool and a second piece substituted. The tool provides for quickly and accurately center drilling with no complications in its use.

The fingers are of hardened metal material so that the work contacting edge possesses extended life and the fingers can be readily replaced, should any or all be damaged to require renewal.

Having described my invention, I claim:

1. A tool of the character disclosed, comprising: a stock having a cylindrical body and a shank extending rearwardly axially from the cylindrical body and adapted for holding a drill bit axially of the stock and to extend into the cylindrical body for center drilling into the end of a piece of work projected into the cylindrical body, and a plurality of fingers cooperatively connected and pivotally mounted upon the forward end of the cylindrical body having the axes at uniform spacing apart, the cooperative connection of the fingers providing for uniformly unitarily moving the same toward the axis of the cylindrical body, each finger having a curved edge for tangentially contacting the surface of the work to centralize the same with the drill bit for center drilling into the end thereof.

2. A tool of the character disclosed comprising a stock having a cylindrical body with a hub extending from an end thereof carrying a shank coaxially for holding a bit axially of the stock and to extend into the body for center drilling into the end of a piece of work projecting into and centered within the body, a series of fingers pivotally mounted on the forward end of the cylindrical body having their pivotal axes at uniform spacing apart, each finger having a curved forward end for tangentially contacting the surface of the work engaged into the cylindrical body and thereby combining to centralize the same with the drill bit, a collar rotatively concentrically mounted on said cylindrical body having one end in abutting contact with an annular shoulder on said body, the rear end of the fingers extending cross-wise of the forward end of the collar to confine the collar upon the body, pins protruding from the collar, one respectively for each finger and engaged into a slot longitudinally in the finger for a coupling connection therewith and unitary movement of the fingers in the rotative motion of the collar to swing the forward curved ends of the fingers into contact with the work to centralize the same within the body, a spring interposed between said body and collar for moving the collar in one rotative direction to normalize the position of the fingers and means for binding the collar to the body to hold the fingers to an adjusted position.

ROBERT A. JOHNSTONE.

REFERENCES CITED

The following references are of record in the file of this patent:

UNITED STATES PATENTS

| Number | Name | Date |
|---|---|---|
| 1,244,953 | Budlong | Oct. 30, 1917 |

FOREIGN PATENTS

| Number | Country | Date |
|---|---|---|
| 138,734 | Germany | Feb. 25, 1903 |